July 6, 1937.   J. D. PHILLIPS   2,085,996
SNOW PLOW DEFLECTOR
Filed Oct. 12, 1936   2 Sheets-Sheet 2
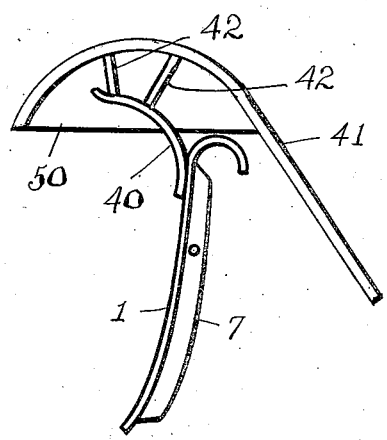
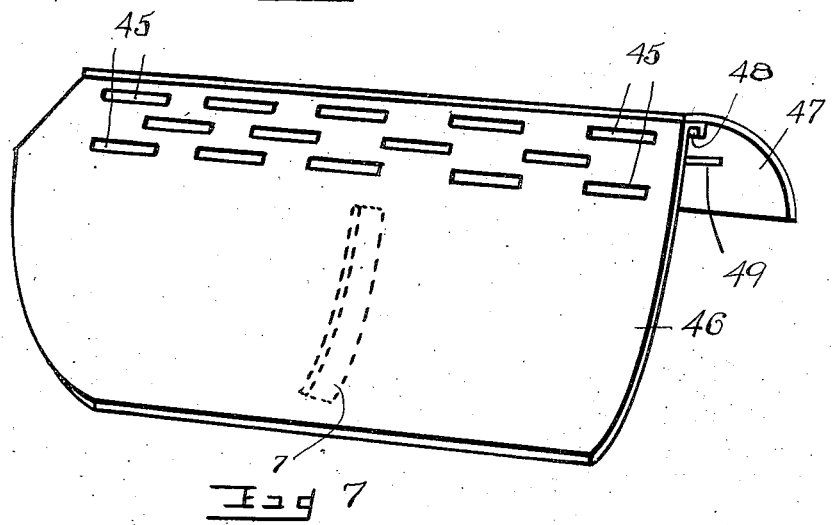
Inventor
James D. Phillips
By Thomas L. Wilder
Attorney Patented July 6, 1937

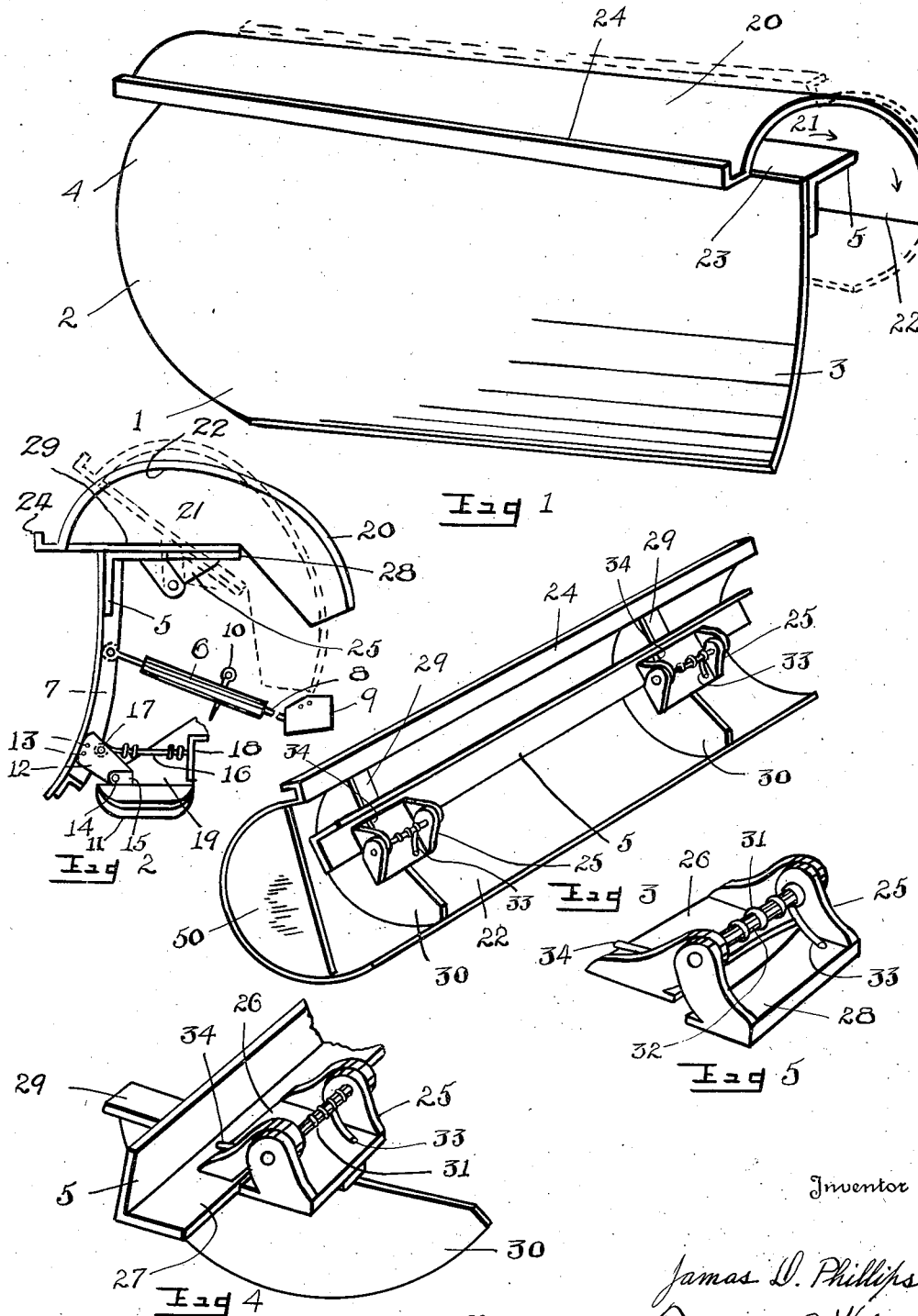

2,085,996

UNITED STATES PATENT OFFICE 2,085,996

SNOW PLOW DEFLECTOR

James D. Phillips, Oriskany, N. Y.

Application October 12, 1936, Serial No. 105,218

7 Claims. (Cl. 37—42)

My invention relates to a snow plow deflector and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a deflector used on snow plows which will prevent the wind from blowing the snow on the radiator or on the windshield. It is designed to cause the wind that strikes against the moldboards of the snow plow to direct it down towards the ground.

Heretofore the driver of a snow plow, especially one attached to an automobile or tractor has experienced great difficulty in steering the snow plow because of the snow that is blown up over the moldboard onto the glass of the windshield, completely covering the same in a very few minutes and thereby obstructing the vision of the driver.

Furthermore, the snow is blown onto the radiator of the automobile and thereby stops the circulation of the water therewithin and hence the boiling of the water in said radiator.

The object will be understood by referring more particularly to the drawings in which, Fig. 1 is a perspective view of the snow plow.

Fig. 2 is a side elevation.

Fig. 3 is a detail perspective view showing the deflector as viewed from below.

Fig. 4 is a detail enlarged view showing a perspective of one of the hinges employed and its connecting parts broken away.

Fig. 5 is an enlarged detail showing a perspective of one of the hinges employed.

Fig. 6 is a side elevation showing a modification of the device.

Fig. 7 is a perspective view of a further modification of the device.

Referring more particularly to the drawings, the device embodies a moldboard 1 which is concaved and a little broader at end 2 than at end 3. Furthermore, end 2 extends laterally at 4, whereby to cause the snow to move off sideways from moldboard 1. An angle iron 5 is fastened in any suitable manner as by rivets or welding to the upper edge of moldboard 1.

The means for attaching the moldboard to the motor truck or tractor, not shown, embodies an arm or sleeve 6 pivotally mounted to a rib 7 formed integral or otherwise fastened to the rear side of said moldboard 1. Said arm is hollow, a portion of its length for the insertion of a rod 8 that is fastened to a bracket 9 attached to the front of the motor truck, not shown. A pin 10 is projected through suitable aligned apertures in arm 6 and rod 8, whereby to hold them together.

A runner 11 is attached to the lower rear surface of moldboard 1. To this end a bracket 12 is riveted at 13, 13 to rib 7. Its lower end is pivoted at 14 to lug 15 fixed to runner 11. A rod 16 is used also for this purpose. Its front end is pivoted at 17 to bracket 12 and its rear end is secured to laterally projecting member 18 formed integral with upstanding part 19 of runner 11.

A wind deflector 20 is hinged to angle iron 5 in such manner that there is provided an opening or space 21 between the under surface of deflector 20 and the upper surface 23 of moldboard 1. This space 21 will allow for the passage of air and fine snow carried therewith up around the interior curved surface of deflector 20 and down towards the ground as indicated by the arrows in Fig. 1. By directing the air currents towards ground, the snow carried therewith is likewise directed towards the ground and thereby prevented from striking and adhering to the radiator, not shown, of the automobile or to the glass of the windshield, also not shown.

Deflector 20 is arc shaped and has its front edge formed into a channel 24 for strengthening purposes. It is disposed over moldboard 1 and extends some distance in front thereof as well as some distance to the rear. The means for pivotally mounting deflector 20 with respect to moldboard 1 embodies the spring hinges 25, 25. Each of the hinges 25 has one leaf 26 secured by welding or other suitable manner to the under surface 27 of an angle iron 5. The other leaf 28 is mounted by welding or brazing to surface 29 of partition or brace member 30. A coiled spring 31 is wound about the pivotal shaft 32 of hinge 25 in each instance. The ends 33 and 34 of each of the springs 31 extend in opposite directions, whereby to hold deflector 20 yielding in normal position as illustrated in full lines in Figs. 1 and 2.

However, should an unusual drift of snow be encountered, deflector 20 will rock back into dotted line position illustrated in Figs. 1 and 2. The rock motion of deflector 20 will prevent said drift of snow from breaking deflector 20 off its mountings.

In operation, the snow plow is attached to the front end of a truck or tractor, not shown, by slipping rod 8 into sleeve 6 and inserting pin 10 in place. The currents of air will strike the broad curved surface of moldboard 1 and be directed upwards thereby to the under surface of deflector 20, sufficiently far in front of moldboard 1 to catch and deflect the wind thereunder. The under surface of deflector 20 will direct the air currents and snow carried therewith around beneath the under surface of deflector 20 and down towards the ground, thereby shielding the radiator and windshield of the automobile, not shown, from being covered by said snow.

In the event an unusual amount of snow or ice is encountered by moldboard 1 when it strikes or comes against the under surface of deflector 20, the said deflector 20 will rock on its hinges 25, 25 to dotted line position illustrated in Figs. 1 and 2 rather than break off from its mountings.

Fig. 6 shows a modification embodying an auxiliary deflector 40 which is attached to the regular deflector 41 by pins 42, 42. Pins 42 in each instance are projected through said deflectors 40 and 41 and welded or riveted in place.

Fig. 7 shows a still further modification in which the apertures 45 are made through the upper portion of moldboard 46. Deflector 47 is attached by welding or otherwise to the upper channel part 48 of moldboard 46. The currents of air will go through the apertures 45 strike the deflector 47 and be directed down through the ground. A horizontal brace 49 is welded or fastened to the rear side of moldboard 46. Its free end is spaced from the adjacent surface of deflector 47 to allow the wind and snow to pass therebetween. Brace 49 will serve as a stop in the event deflector 47 is pushed back thereagainst by some unusual strain.

Each of the several modifications include an end closing member 50 to prevent the snow from going off the right hand side of the device.

Having thus described my invention what I claim as new and desire to secure by Letters Patent is as follows:

1. In a snow plow deflector, a moldboard, a deflector member supported above and vertically spaced from the upper edge of said moldboard, whereby to direct the currents of air striking said moldboard down toward the ground.

2. In a snow plow deflector, a moldboard, an arc shaped deflector member hinged to said moldboard and supported vertically spaced from the upper edge of said moldboard, whereby to direct the currents of air toward the ground.

3. In a snow plow deflector, a moldboard, a deflector member hinged to said moldboard, means for supporting said deflector above and vertically spaced from the upper edge of said moldboard and spring means for holding said deflector in normal position whereby to deflect the currents of air striking said moldboard toward the ground.

4. In a snow plow deflector, a moldboard, an arc shaped deflector member hinged to said moldboard, said deflector member being supported above and vertically spaced from the upper edge of said moldboard and spring means for holding said deflector in normal position, whereby to deflect the currents of air striking said moldboard toward the ground.

5. In a snow plow deflector, a moldboard, an angle iron secured to the upper edge of said moldboard, a deflector member supported above said moldboard, hinges connecting said angle iron and said deflecting member and springs on said hinges for holding said deflector member, in normal position, whereby to direct the currents of air striking said moldboard toward the ground.

6. In a snow plow deflector, a moldboard, an arc shaped deflector member hinged to said moldboard, said deflector member being pivotally supported above said moldboard, whereby to overlap the same and spring means for holding said deflector member in normal position, whereby to deflect currents of air striking said moldboard toward the ground.

7. In a snow plow deflector, a moldboard, a member secured to the upper edge of said moldboard, an arc shaped deflector member pivotally supported to said first named member above said moldboard, hinges connecting said deflector member with said first named member and springs on said hinges for holding said deflector member in normal position whereby to direct the currents of air striking said moldboard toward the ground.

JAMES D. PHILLIPS.